United States Patent
Jen et al.

(10) Patent No.: US 9,455,759 B2
(45) Date of Patent: Sep. 27, 2016

(54) PROTECTION DEVICE CAPABLE OF ROTATABLY SUPPORTING A PORTABLE ELECTRONIC DEVICE

(71) Applicant: Wistron Corporation, New Taipei (TW)

(72) Inventors: Tsu-Yin Jen, New Taipei (TW); Jen-Hao Liu, New Taipei (TW); Chih-Ta Chen, New Taipei (TW); Kuan-Chung Shih, New Taipei (TW); Yao-Wei Wang, New Taipei (TW); Chun-Ming Wu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/595,224

(22) Filed: Jan. 13, 2015

(65) Prior Publication Data
US 2016/0049981 A1    Feb. 18, 2016

(30) Foreign Application Priority Data
Aug. 18, 2014  (TW) .............................. 103128339 A (51) Int. Cl.
*H04B 1/3888* (2015.01)
*H04B 1/3877* (2015.01)
(Continued)

(52) U.S. Cl.
CPC .......... *H04B 1/3888* (2013.01); *H04B 1/3877* (2013.01); *H04M 1/04* (2013.01); *H04M 1/185* (2013.01)

(58) Field of Classification Search
CPC .............. H04B 1/3888; H04B 1/3877; A45C 2011/002; A45C 2011/003; A45C 13/36; A45C 13/002; G06F 2200/1633
See application file for complete search history.

(56) References Cited

U.S. PATENT DOCUMENTS

D712,413 S  *  9/2014  Fukai ........................... D14/440
8,887,902 B1 * 11/2014  Liu ........................ G06F 1/1628
                                                           206/320

(Continued)

FOREIGN PATENT DOCUMENTS

TW      M253820       12/2004
TW      M401147 U1    4/2011

(Continued)

OTHER PUBLICATIONS

Office action mailed on Jan. 25, 2016 for the Taiwan application No. 103128339, filing date: Aug. 18, 2014, p. 1 line 10-14, p. 2-4 and p. 5 line 1-24.

*Primary Examiner* — Bobbak Safaipour
*Assistant Examiner* — Devan Sandiford
(74) *Attorney, Agent, or Firm* — Winston Hsu; Scott Margo (57) ABSTRACT

A protection device for rotatably supporting a portable electronic device includes a cover, a holder and a transmission cable. The holder has a first surface and a second surface opposite to each other. A sunken slot is formed on the first surface which supports the portable electronic device. A hole structure of the holder is connected to the sunken slot and formed between the first surface and the second surface, and an arc structure is disposed on the second surface to rotatably assemble with a rotary portion of the cover. A section of the transmission cable is connected to a first connector to be disposed inside the sunken slot, another section of cable is connected to a second connector to be embedded into the cover, and a middle section of the cable pierces through the hole structure to electrically connect the first connector with the second connector.

12 Claims, 10 Drawing Sheets

(51) Int. Cl.
*H04M 1/04* (2006.01)
*H04M 1/18* (2006.01)

(56) References Cited

U.S. PATENT DOCUMENTS

| | | | |
|---|---|---|---|
| 2003/0222149 A1* | 12/2003 | Solomon | G06F 1/1669 235/472.01 |
| 2004/0090742 A1* | 5/2004 | Son | G06F 1/1626 361/679.09 |
| 2006/0038795 A1* | 2/2006 | Lee | E05B 65/006 345/173 |
| 2007/0181456 A1* | 8/2007 | Kusuda | G06F 1/1626 206/443 |
| 2011/0090654 A1* | 4/2011 | Mizukami | H05K 5/0247 361/752 |
| 2011/0259788 A1* | 10/2011 | Zeliff | G06F 1/1626 206/701 |
| 2012/0194448 A1* | 8/2012 | Rothkopf | A45C 13/002 345/173 |
| 2012/0273630 A1 | 11/2012 | Gillespie-Brown | |
| 2013/0106353 A1* | 5/2013 | Foster | H02J 7/0044 320/114 |
| 2014/0063715 A1* | 3/2014 | Hwang | G06F 1/1632 361/679.15 |
| 2015/0188593 A1* | 7/2015 | Hu | H04B 1/3877 455/575.8 |
| 2015/0205327 A1* | 7/2015 | Daley, III | A45F 3/10 361/679.03 |
| 2016/0011630 A1* | 1/2016 | Chen | G06F 1/1675 361/679.55 |

FOREIGN PATENT DOCUMENTS

| | | | | |
|---|---|---|---|---|
| TW | M449498 U1 | 4/2013 | | |
| TW | EP 2854420 A1 * | 4/2015 | | H04R 1/1033 |

* cited by examiner

PROTECTION DEVICE CAPABLE OF ROTATABLY SUPPORTING A PORTABLE ELECTRONIC DEVICE

BACKGROUND OF THE INVENTION

1. Field of the Invention

The present invention relates to a protection device, and more particularly, to a protection device capable of rotatably supporting a portable electronic device.

2. Description of the Prior Art

With the advanced technology, the tablet computer is widespread applied to entertainment, education and other domains because of small-size design and convenient portable property. The tablet computer utilizes the touch panel to be a predetermined input interface for volume decrease and preferred portable convenience. Touch input of the tablet computer may be retarded and a displaying screen of the tablet computer is wasted by the virtual keyboard since the tablet computer is applied to the education purpose, so that the external physical keyboard is utilized to be the auxiliary input interface. The screen panel of the tablet computer is exposed when the tablet computer is not in use, and the protection cover is usually collocated with the tablet computer to prevent the screen panel or the housing from damage by scrape or accidental fall. The tablet computer further can stand over the supporting plane (such as the table) by the protection cover to keep a specific view angle. The auxiliary devices (which can be an external keyboard, an external power supply and so on) applied to the tablet computer may result in inconvenience even though functions of the tablet computer can be expanded as the notebook computer. Therefore, integration of the foresaid auxiliary devices for convenient operation of the tablet computer is an important issue of the related industry.

The protection cover integrated with the physical keyboard exists in the present market. The conventional protection cover includes a top body and a low body connected with each other, the physical keyboard can be installed on the low body and the tablet computer can be detachably fixed on the top body. Further, a rigid sheath can be disposed on the top body and the tablet computer is able to detachably fix inside the rigid sheath. The rigid sheath may be rotatably disposed on the top body to switch operational modes of the tablet computer. However, the tablet computer disposed on the top body is communicated with the keyboard disposed on the low body by wireless communication (such as Bluetooth), the wireless communication may be easily interfered when plenty of tablet computers are used in a crowded environment, including the classroom or the conference room, and how to prevent the wireless communication from interference without sacrificing operational convenience is an unsolved difficulty.

SUMMARY OF THE INVENTION

The present invention provides a protection device capable of rotatably supporting a portable electronic device for solving above drawbacks.

According to the claimed invention, a protection device capable of rotatably supporting a portable electronic device is disclosed. The protection device includes a cover, a holder, a first connector, a second connector and a transmission cable. The cover includes a rotary portion. The holder has a first surface and a second surface opposite to each other. The first surface has a sunken slot and is adapted to support the portable electronic device. The holder includes a hole structure and an arc structure. The hole structure is connected to the sunken slot and formed between the first surface and the second surface. The arc structure is disposed on the second surface to rotatably assemble with the rotary portion. The first connector is disposed on the first surface to electrically connect to the portable electronic device. The second connector is disposed on the cover to electrically connect o an external input device. The transmission cable has a first section, a second section and a third section connected with each other. The first section is connected to the first connector and disposed inside the sunken slot. The second section is connected to the second connector and embedded into the cover. The third section is connected between the first section and the second section and pierces through the hole structure in a flexibly deformable manner.

According to the claimed invention, the hole structure includes an inlet and an outlet. The inlet is connected to the sunken slot, and the outlet is an unclosed place of the arc structure. A length of the third section of the transmission cable is substantially greater than a distance between the inlet and the outlet.

According to the claimed invention, the third section of the transmission cable is flexibly disposed inside the arc structure.

According to the claimed invention, the hole structure includes a supporting portion, a first accommodating portion and an opening. The first accommodating portion is sunk into the supporting portion and faces the first surface. A part of the third section is movably disposed inside the first accommodating portion and passes from the first surface to the second surface through the opening.

According to the claimed invention, the hole structure further includes a second accommodating portion sank into the supporting portion and faces the second surface. The other part of the third section is movably disposed inside the second accommodating portion and connected to the second section through the unclosed place of the arc structure.

According to the claimed invention, the holder further includes a constraining component assembled with the arc structure to buckle the rotary portion.

According to the claimed invention, the constraining portion is disposed on the holder via a fixing component.

According to the claimed invention, the protection device further includes a decorating component disposed on the first surface of the holder to shelter the sunken slot.

According to the claimed invention, the cover includes a first body, a second body and a third body foldably connected with each other. The rotary portion is disposed on the first body to connect with the holder. The holder contacts against the second body as the holder is switched to an operation mode. The second connector is disposed on the third body to detachably assemble with the external input device.

According to the claimed invention, the cover further includes at least one magnetic component disposed on the third body to assemble with the external input device by magnetic suction effect.

According to the claimed invention, the cover further includes a first contacting portion disposed on the rotary portion. The holder further includes a second contacting portion disposed on the arc structure. The first contacting portion contacts against the second contacting portion since the arc structure rotates relative to the rotary portion, so as to stop relative rotation between the cover and the holder.

According to the claimed invention, a range of the relative rotation between the cover and the holder is substantially smaller than 130 degrees.

The protection device of the present invention respectively disposes the first connector and the second connector on different bodies of the cover, and utilizes the physical transmission cable to connect between the first connector and the second connector, so as to avoid a drawback that wireless signal transmission between the portable electronic device and the external input device is easily interfered in prior art. Furthermore, apart of the transmission cable (such as the third section) of the present invention is movably accommodated inside the hole structure and the arc structure, the third section of the transmission cable can be twisted and/or deformed under protection of the hole structure and the arc structure when the holder rotates relative to the cover, so the transmission cable is not damaged by the excess pulling motion. Comparing to the prior art, the protection device of the present invention utilizes the physical transmission cable to avoid transmission interruption that is always happened in wireless connection or pin-to-pin connection, and utilizes the hole structure and the arc structure to protect the physical transmission cable during rotation between the holder and the cover, so as to effectively increase serviceable life and safety of the product.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
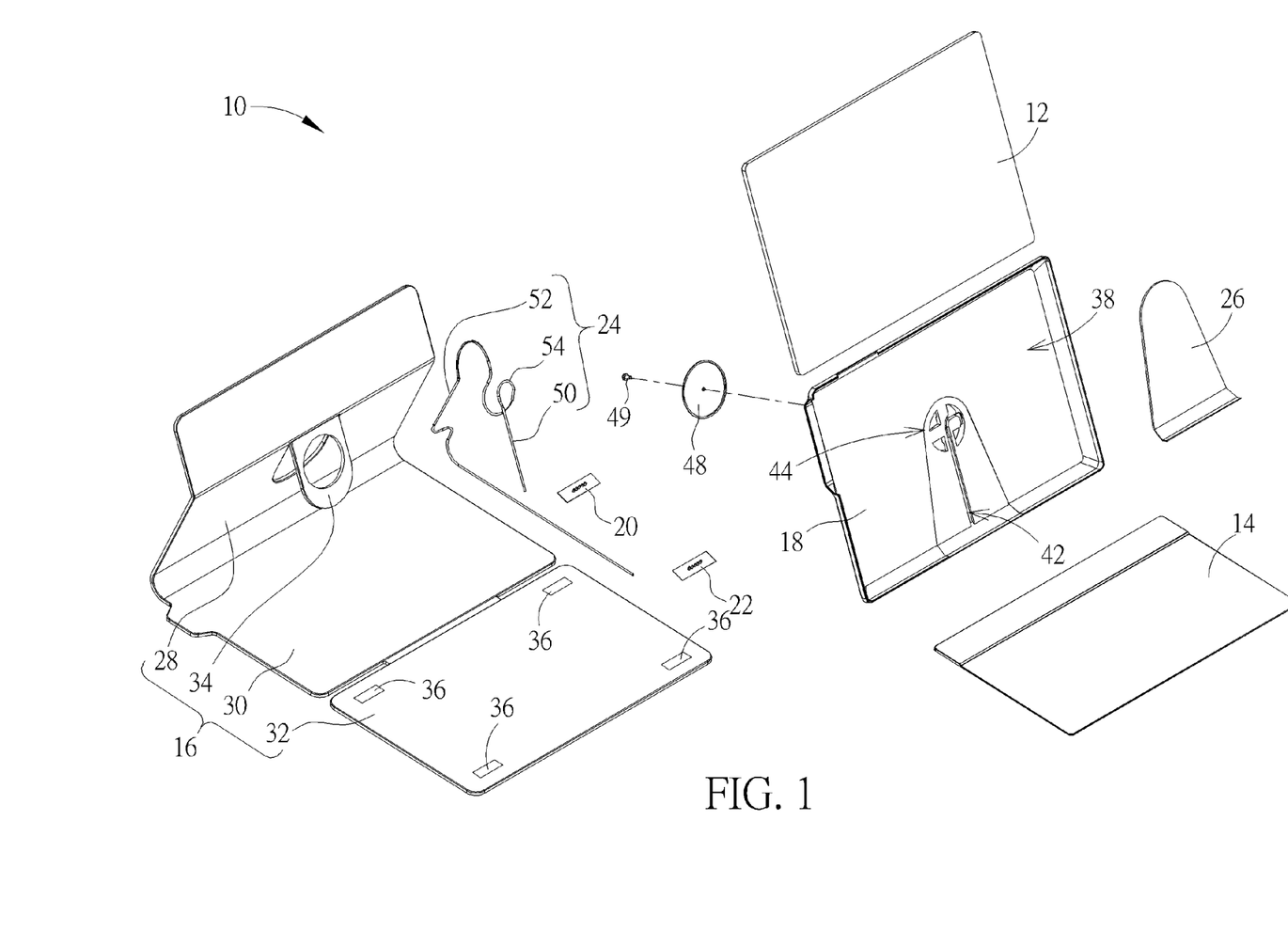
FIG. 1 and FIG. 2 respectively are exploded diagrams of a protection device in different views according to an embodiment of the present invention.
Figure 2:
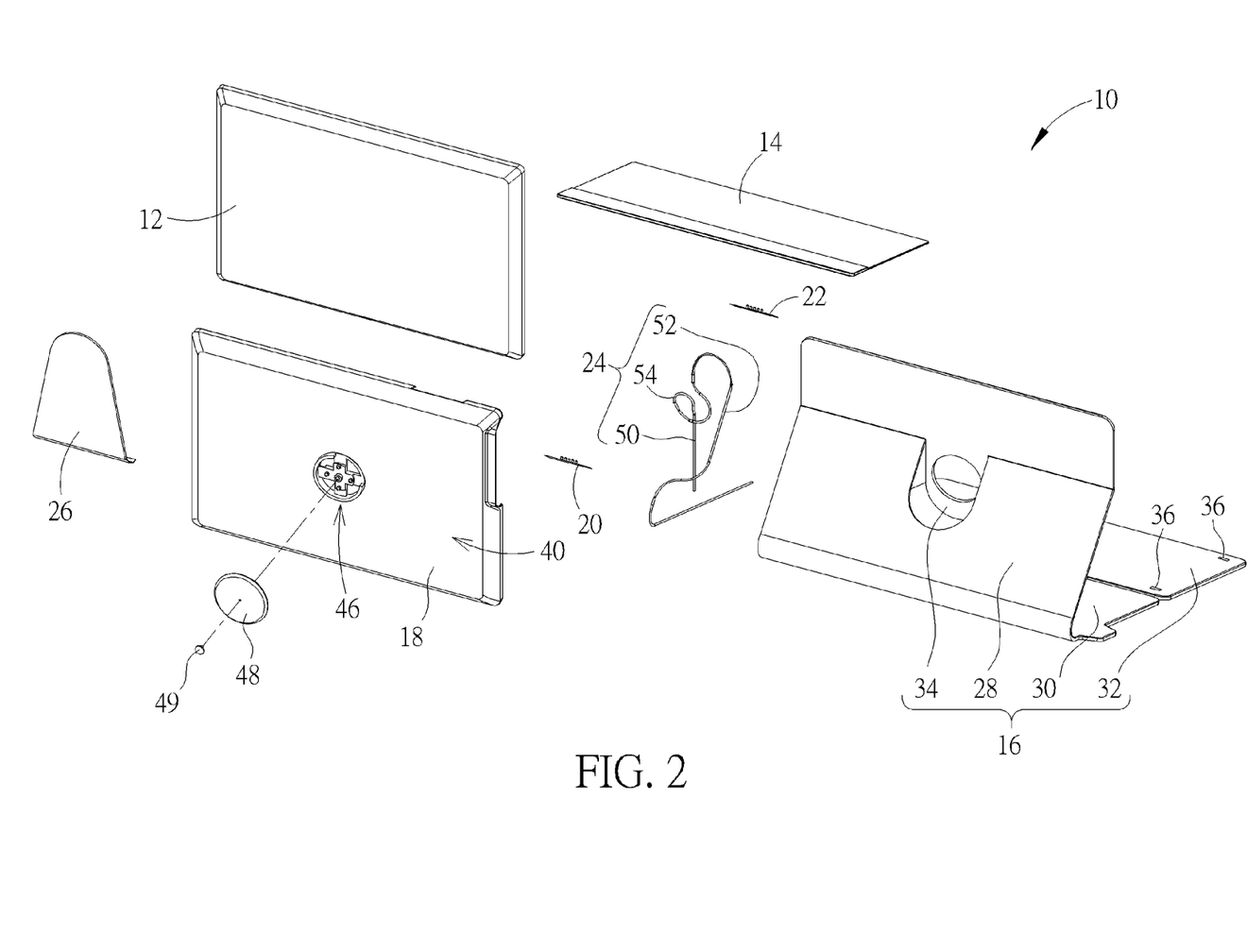

Please refer to FIG. 1 and FIG. 2. FIG. 1 and FIG. 2 respectively are exploded diagrams of a protection device 10 in different views according to an embodiment of the present invention. The protection device 10 can rotatably support the portable electronic device 12, and keeps electrical connection between the portable electronic device 12 and the external input device 14 during rotation of the portable electronic device 12. The portable electronic device 12 can be an apparatus with a touch panel, such as a tablet computer, a digital photo frame and a smart phone. The external input device 14 can be an input apparatus, such as an external keyboard or a handwriting board. The protection device 10 is a friction-proofing foldable sheath which can be detachably assembled with the portable electronic device 12 and/or the external input device 14. The portable electronic device 12 can rotate relative to the external input device 14 (or a supporting plane) via the protection device 10, so as to switch between an upright mode and a recumbent mode.

The protection device 10 includes a cover 16, a holder 18, a first connector 20, a second connector 22, a transmission cable 24 and a decorating component 26. The cover 16 includes a first body 28, a second body 30 and a third body 32 foldably connected with each other. The second body 30 is flexibly bent between the first body 28 and the third body 32. The cover 16 further includes a rotary portion 34 and at least one magnetic component 36. The rotary portion 34 is disposed on the first body 28 and connected to the holder 18. The magnetic component 36 is disposed on the third body 32, and the third body 32 can assemble with the external input device 14 by magnetic suction effect; accordingly, the external input device 14 includes a magnet or a magnetic unit matched with the magnetic component 36. The holder 18 has a first surface 38 and a second surface 40 opposite to each other. A sunken slot 42 is formed on the first surface 38 to accommodate the transmission cable 24. The decorating component 26 is movably disposed on the first surface 38 to shelter the sunken slot 42 for preferred aesthetic appearance.

The holder 18 includes a hole structure 44, an arc structure 46 and a constraining component 48. The hole structure 44 is connected to the sunken slot 44 and formed between the first surface 38 and the second surface 40. The arc structure 46 is disposed on the second surface 40 and surrounds the hole structure 44. The arc structure 46 is rotatably sheathed on the rotary portion 34 and assembled with the constraining component 48 to buckle the rotary portion 34. For example, the arc structure 46 inserts into a cavity of the rotary portion 34 from a side of the rotary portion 34, and the constraining component 48 is locked on the arc structure 46 from the other opposite side of the rotary portion 34, so that the holder 18 can freely rotate relative to the cover 16 to switch between the upright mode and the recumbent mode. Generally, the constraining component 48 is locked on the holder 18 by a fixing component 49.

The first connector 20 is disposed on the first surface 38 to electrically connect with the portable electronic device 12. The second connector 22 is disposed on the third body 32 of the cover 16 to electrically connect with the external input device 14. Position of the first connector 20 on the first surface 38 corresponds to position of a connecting terminal of the portable electronic device 12, for example, the first connector 20 is disposed on a lateral side of the first surface 38. Position of the second connector 22 on the cover 16 corresponds to position of a connecting terminal of the external input device 14, for example, the second connector 22 is disposed on a lateral side of the third body 32. The transmission cable 24 includes a first section 50, a second section 52 and a third section 54 connected with each other. The first section 50 is electrically connected to the first connector 20 and disposed inside the sunken slot 42. The second section 52 is electrically connected to the second connector 22 and embedded into the cover 16, such as being buried in the third body 32, the second body 30 and the first body 28. Two ends of the third section 54 are flexibly bent from the first section 50 and the second section 52. The third section 54 can pass through the hole structure 44 in a flexibly deformable manner, so as to prevent the transmission cable 24 from damage since the holder 18 rotates relative to the cover 16.

Figure 3:
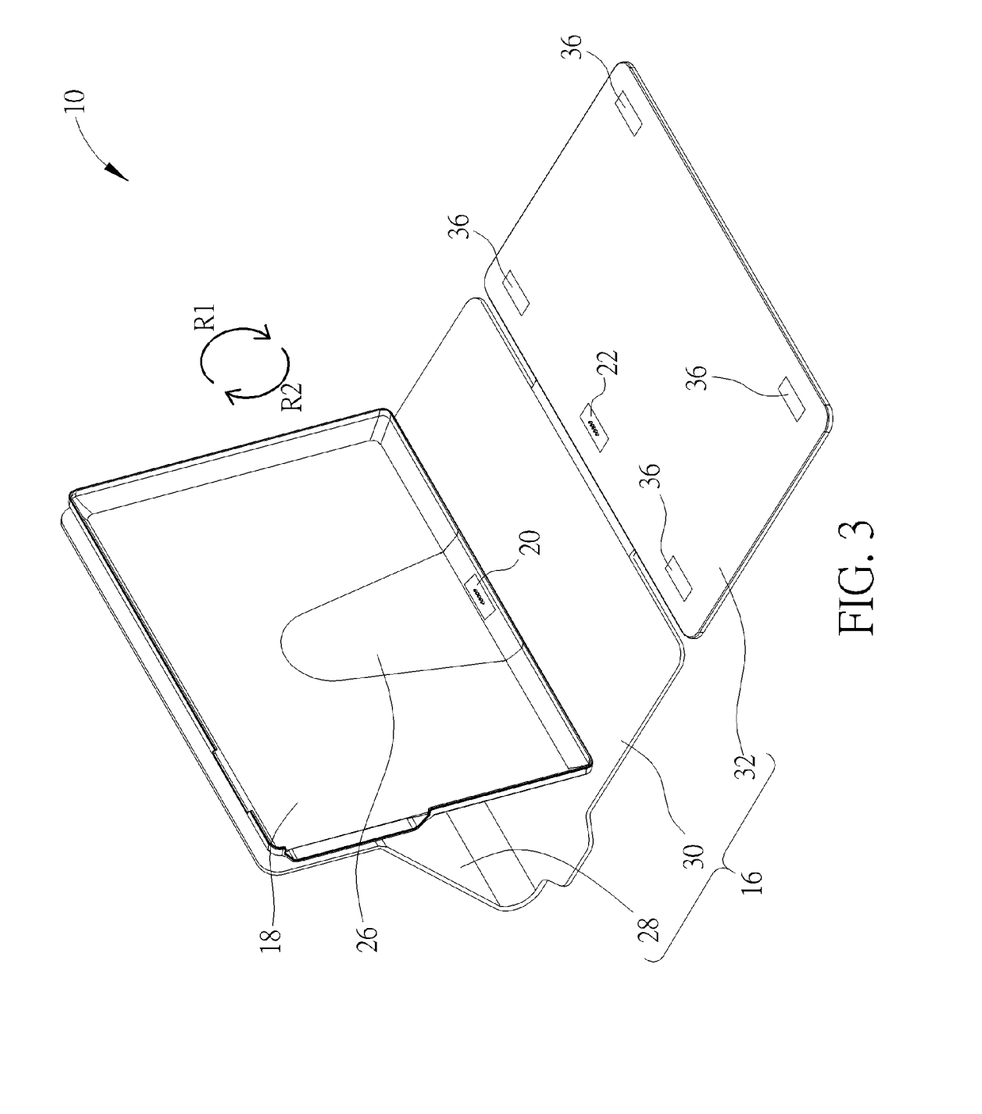
FIG. 3 is a diagram of the protection device switched to the recumbent mode according to the embodiment of the present invention.
Figure 4:
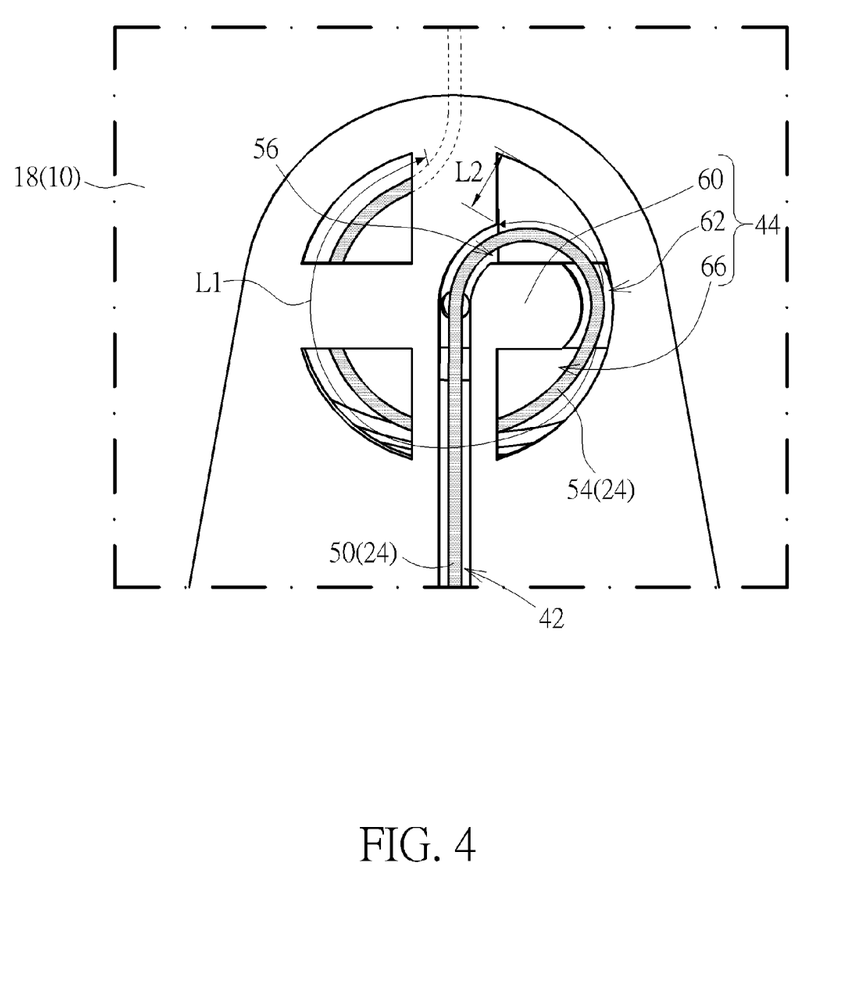
FIG. 4 and FIG. 5 respectively are diagrams of partial structure of the protection device switched to the recumbent mode in different views according to the embodiment of the present invention.
Figure 5:
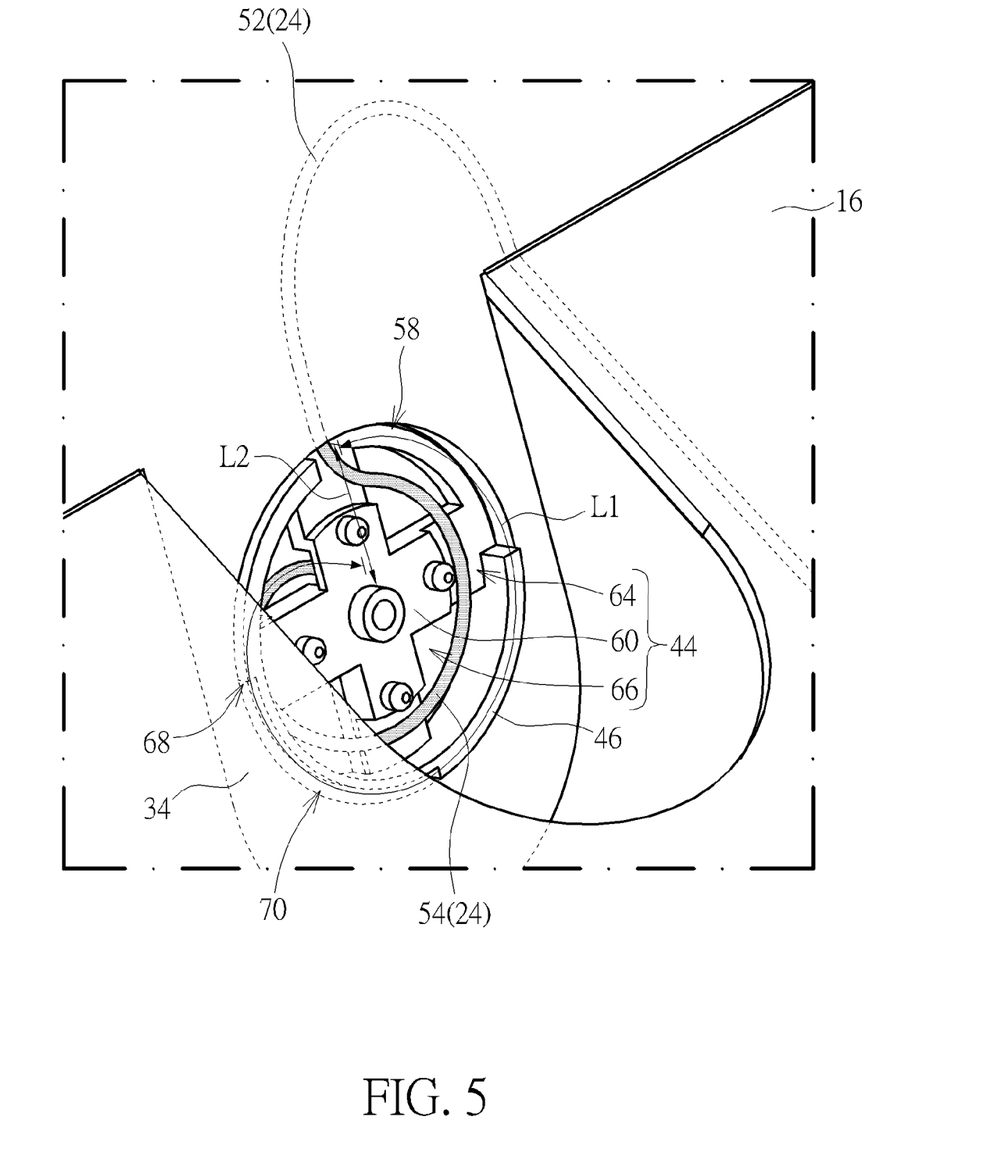
Figure 6:
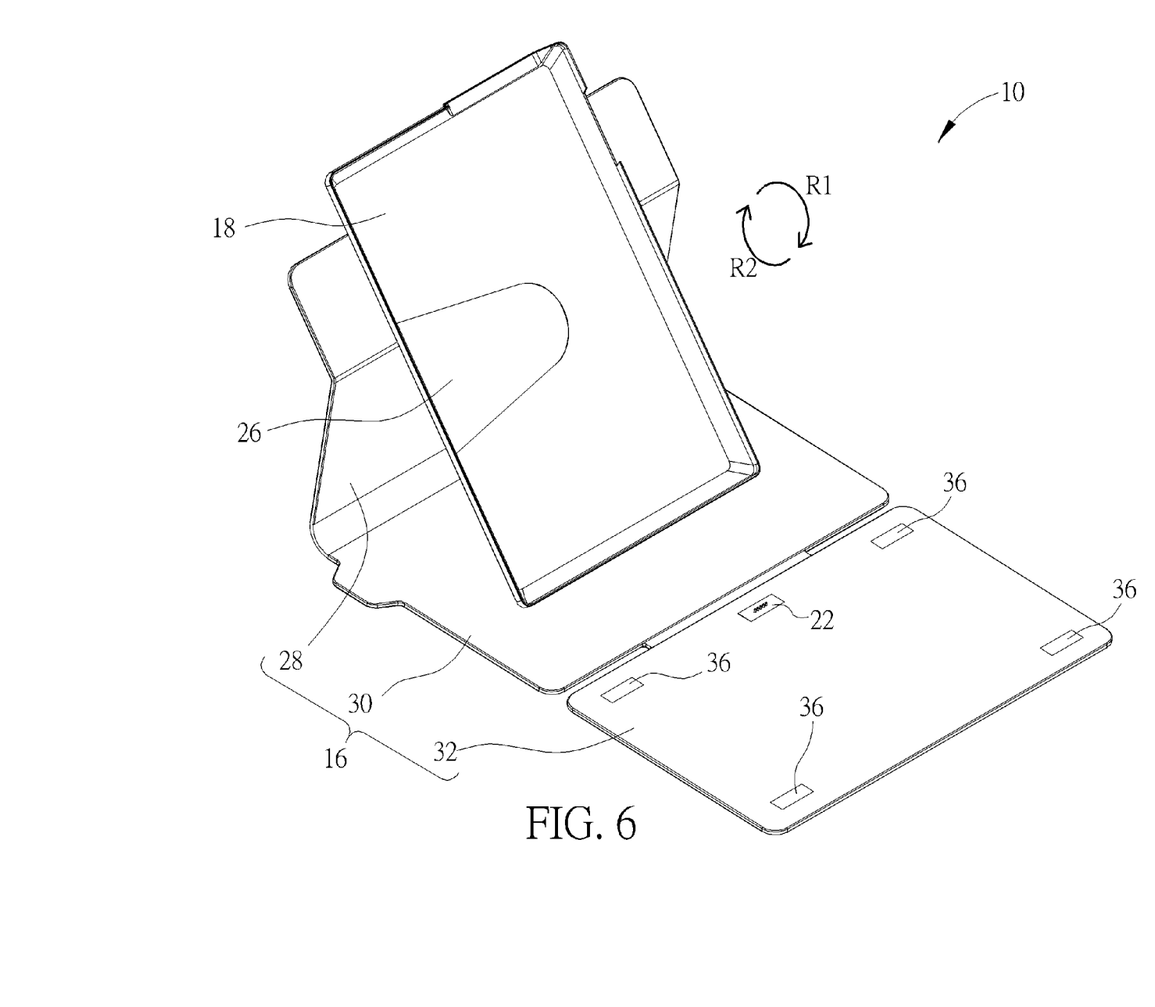
FIG. 6 is a diagram of the protection device switched to the upright mode according to the embodiment of the present invention.
Figure 7:
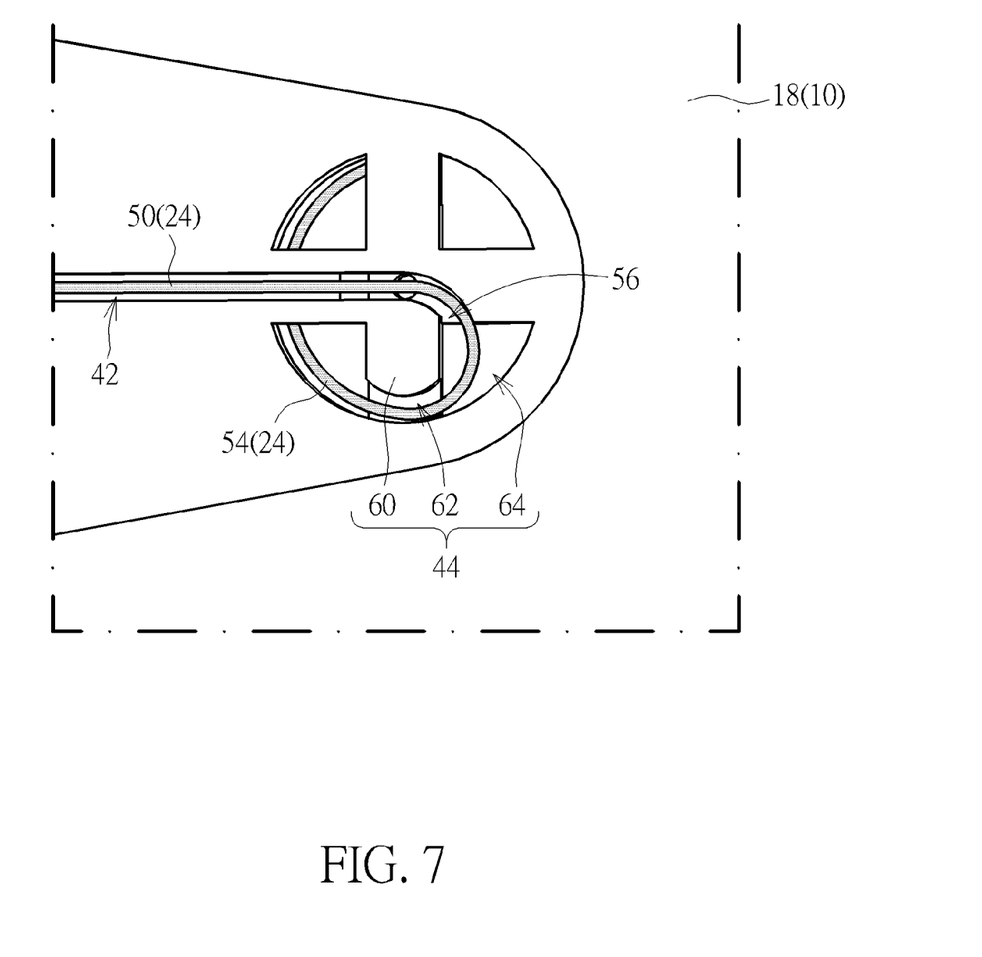
FIG. 7 and FIG. 8 respectively are diagrams of partial structure of the protection device switched to the upright mode in different views according to the embodiment of the present invention.
Figure 8:
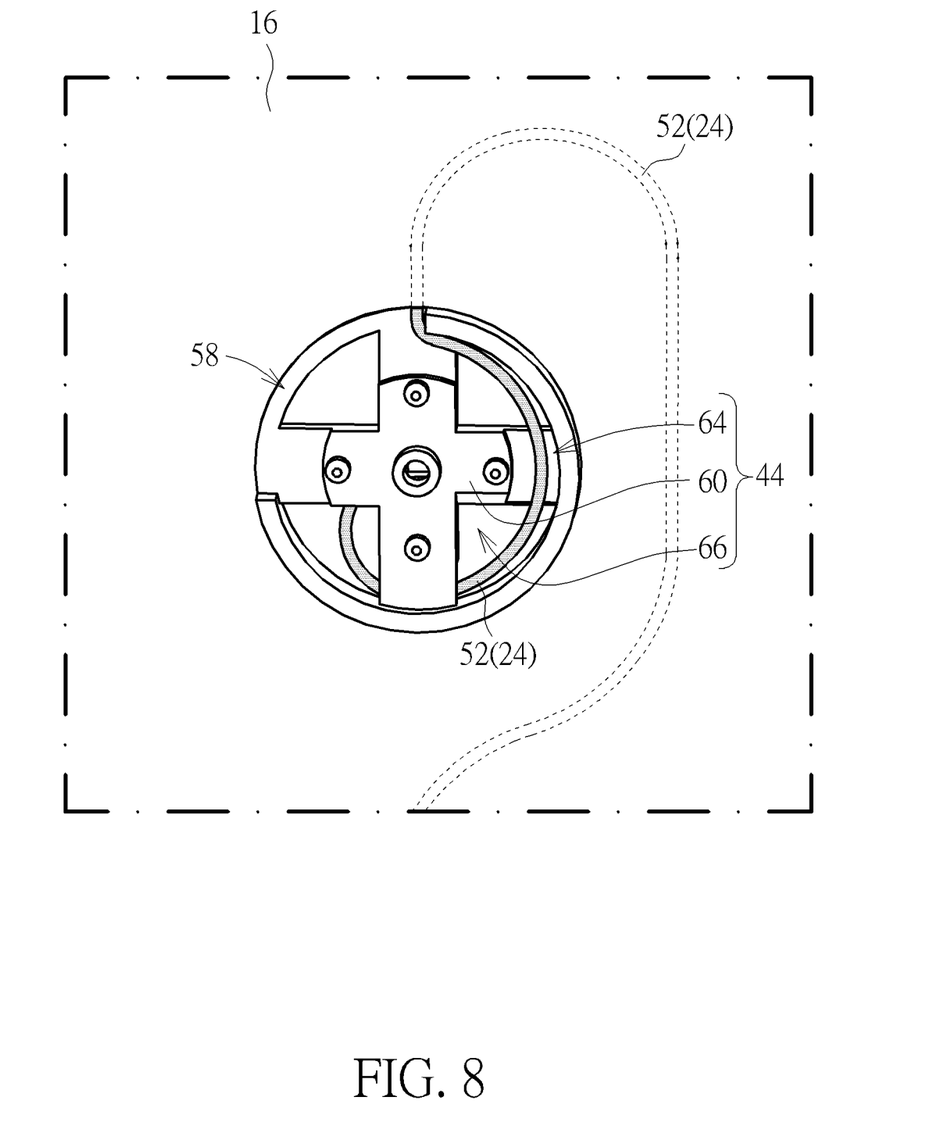

Please refer to FIG. 3 to FIG. 8. FIG. 3 is a diagram of the protection device 10 switched to the recumbent mode according to the embodiment of the present invention. FIG. 4 and FIG. 5 respectively are diagrams of partial structure of the protection device 10 switched to the recumbent mode in different views according to the embodiment of the present invention. FIG. 6 is a diagram of the protection device 10 switched to the upright mode according to the embodiment of the present invention. FIG. 7 and FIG. 8 respectively are diagrams of partial structure of the protection device 10 switched to the upright mode in different views according to the embodiment of the present invention.

The hole structure 44 includes an inlet 56 and an outlet 58 where the third section 54 of the transmission cable 24 passes through to connect between the first section 50 and the second section 52. The inlet 56 is connected with the sunken slot 42 and located on the first surface 38 of the holder 18. The outlet 58 is an unclosed place of the arc structure 46, for example, the arc structure 48 can be a C-ring, and the outlet 58 is a breach of the C-ring. It should be mentioned that a length L1 of the third section 54 of the transmission cable 24 is substantially greater than a distance L2 between the inlet 56 and the outlet 58. The third section 54 can be an annular shape as shown in the figures, and further can be a folded shape, an overlapped shape and so on. When the holder 18 rotates relative to the cover 16, the transmission cable 24 is twisted and deformed by pulling motion of the hole structure 44, the third section 54 has sufficient deformable tolerance because of structural characteristic that the length L1 greater than the distance L2, so as to prevent the transmission cable 24 from fracture during rotation of the holder 18. That is, the third section 54 of the transmission cable 24 is flexibly disposed inside the arc structure 46 and covered by the constraining component 48 to avoid detachment of the transmission cable 24.

In the embodiment of the present invention, the hole structure 44 includes a supporting portion 60, a first accommodating portion 62, a second accommodating portion 64 and an opening 66. The opening 66 is formed between the supporting portion 60 and a body of the holder 18. The third section 54 of the transmission cable 24 passing through the hole structure 44 via the inlet 56 can directly stretch out the outlet 58 via the opening 66, or can surround inside the hole structure 44 as an annular unit and then to reach out the outlet 58. The first accommodating portion 62 and the second accommodating portion 64 are selectively disposed on the supporting portion 60. The first accommodating portion 62 and the second accommodating portion 64 are sunk into the supporting portion 60 and respectively face toward the first surface 38 and the second surface 40. A part of the third section 54 is connected with the first section 50 and movably disposed inside the first accommodating portion 62, and further passes through the opening 66 from the first surface 38 to the second surface 40. The other part of the third section 54 is movably disposed inside the second accommodating portion 64 and connected with the second section 52 via the unclosed place (which means the breach of the C-ring) of the arc structure 46. Therefore, the supporting portion 44, the first accommodating portion 62 and the second accommodating portion 64 can be utilized to maintain the third section 54 as an annular unit similar to the arc structure 46 inside the hole structure 44, and the transmission cable 24 is not pressed no matter what a rotating angle formed between the cover 16 and the holder 18.

As shown in FIG. 5 and FIG. 8, the cover 16 further can include a first contacting portion 68 disposed on the rotary portion 34. The holder 18 further can include a second contacting portion 70 disposed on the arc structure 46. The first contacting portion 68 can be a protrusion, the second contacting portion 70 can be an arc sliding slot, and the first contacting portion 68 (the protrusion) is slidably disposed inside the second contacting portion 70 (the arc sliding slot). The first contacting portion 68 contacts against inner walls of two edges of the second contacting portion 70 to stop rotation between the cover 16 and the holder 18. In addition, the first contacting portion 68 further can be the arc sliding slot so the second contacting portion 70 is the protrusion accordingly. The first contacting portion 68 and the second contacting portion 70 may be any kind of constraint mechanism, shapes of the contacting portions are not limited to the above-mentioned embodiment, and depend on design demand.

As shown in FIG. 3 to FIG. 5, the holder 18 is switched to the recumbent mode, the first section 50 of the transmission cable 24 stays inside the sunken slot 42 and is connected with an end of the third section 54 via connection space between the sunken slot 42 and the inlet 56. The third section 54 stretches toward the first accommodating portion 62 through the inlet 56 to be accommodated inside the second accommodating portion 64 via the opening 66, and reaches out the arc structure 46 through the outlet 58. The second section 52 is embedded inside the cover 16 (such as being buried in an inner layer of the cover 16), and connected to the other end of the third section 54 through the outlet 58 (such as the unclosed place of the arc structure 46). In this embodiment, the supporting portion 60 can be a cruciform structure, the first accommodating portion 62 and the second accommodating portion 64 are respectively formed on opposite surfaces on branches of the cruciform structure, and the cruciform structure may have, but not limited to, single first accommodating portion 62 and two second accommodating portions 64. The third section 54 of the transmission cable 24 surrounds across the branches of the cruciform structure to form the annular unit with a three-fourths circle. The third section 54 preferably does not contact inner walls of the hole structure 44 and/or the arc structure 46 and has sufficient tolerance for flexible deformation.

As shown in FIG. 6 to FIG. 8, the holder 18 substantially rotates to 90 degrees at clockwise direction R1 to switch to the upright mode. The first section 50 of the transmission cable 24 stably stays inside the sunken slot 42. The third section 54 located inside the hole structure 44 can be flexibly deformed according to rotation of the holder 18. The third section 54 may be maintained as the annular unit slightly smaller than the three-fourths circle due to constraint of the first accommodating portion 62 and the second accommodating portion 64. Curvature of the third section 54 in the upright mode is different from curvature of the third section 54 in the recumbent mode. A part of the third section 54 may be close to or actually contact the inner walls of the hole structure 44 and/or the arc structure 46 since the third section 54 is flexibly deformed. However, the third section 54 is completely covered between the arc structure 46 and the constraining component 48, so the transmission cable 24 is not damaged by excess pulling motion and not fractured by pressure of other components of the protection device 10. The transmission cable 24 can keep preferred transmission quality. The holder 18 can be rotated to 90 degrees at counterclockwise direction R2 to switch the protection device 10 from the upright mode to the recumbent mode. A rotating direction and a rotating range of the holder 18 can be constrained within specific reference mentioned in the present invention by assembly of the first contacting portion 68 and the second contacting portion 70, and the third section 54 of the transmission cable 24 can be protected without accidental fracture.

Figure 9:
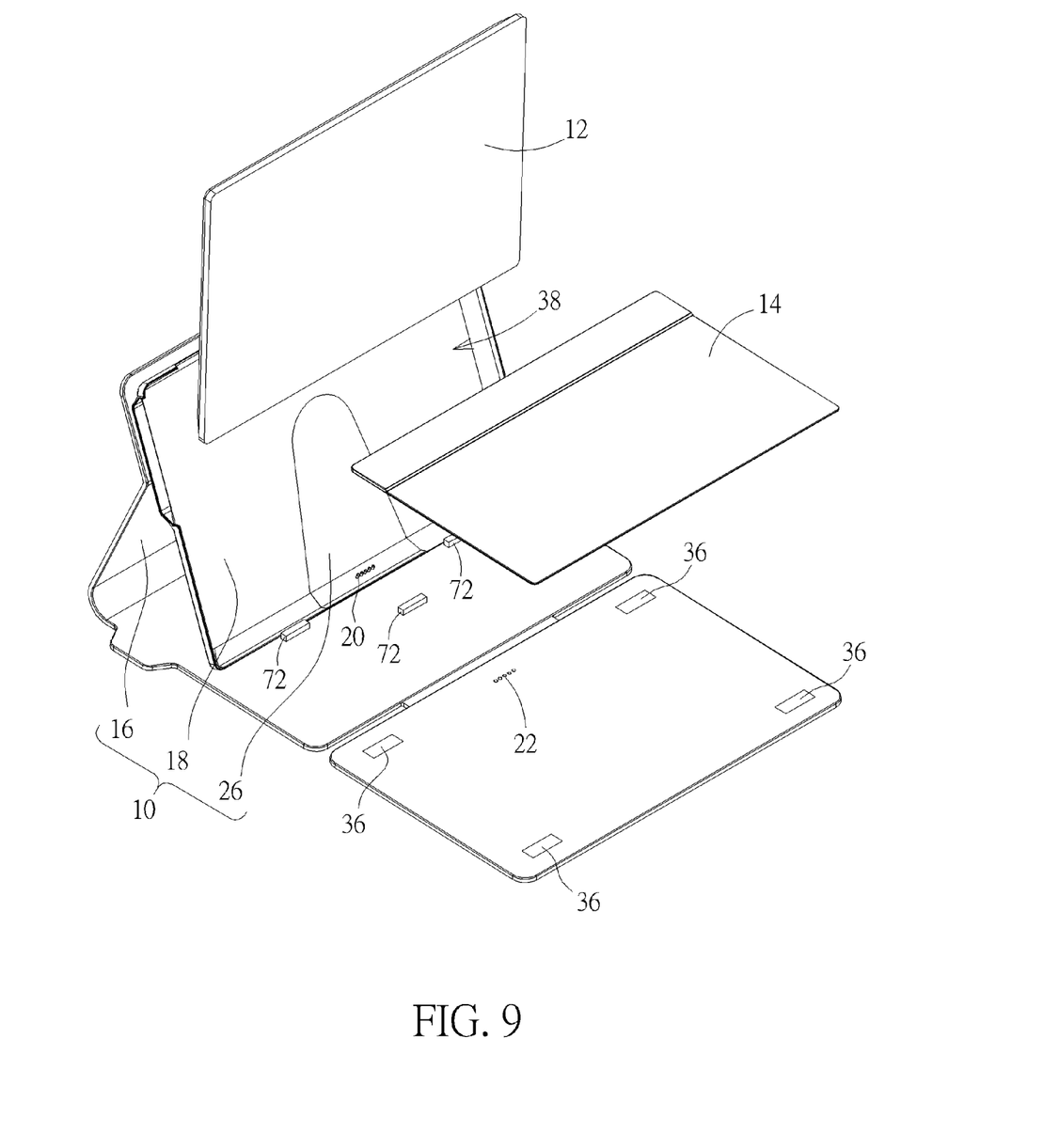
FIG. 9 is a diagram of the protection device, the portable electronic device and the external input device not assembled with each other according to the embodiment of the present invention.
Figure 10:
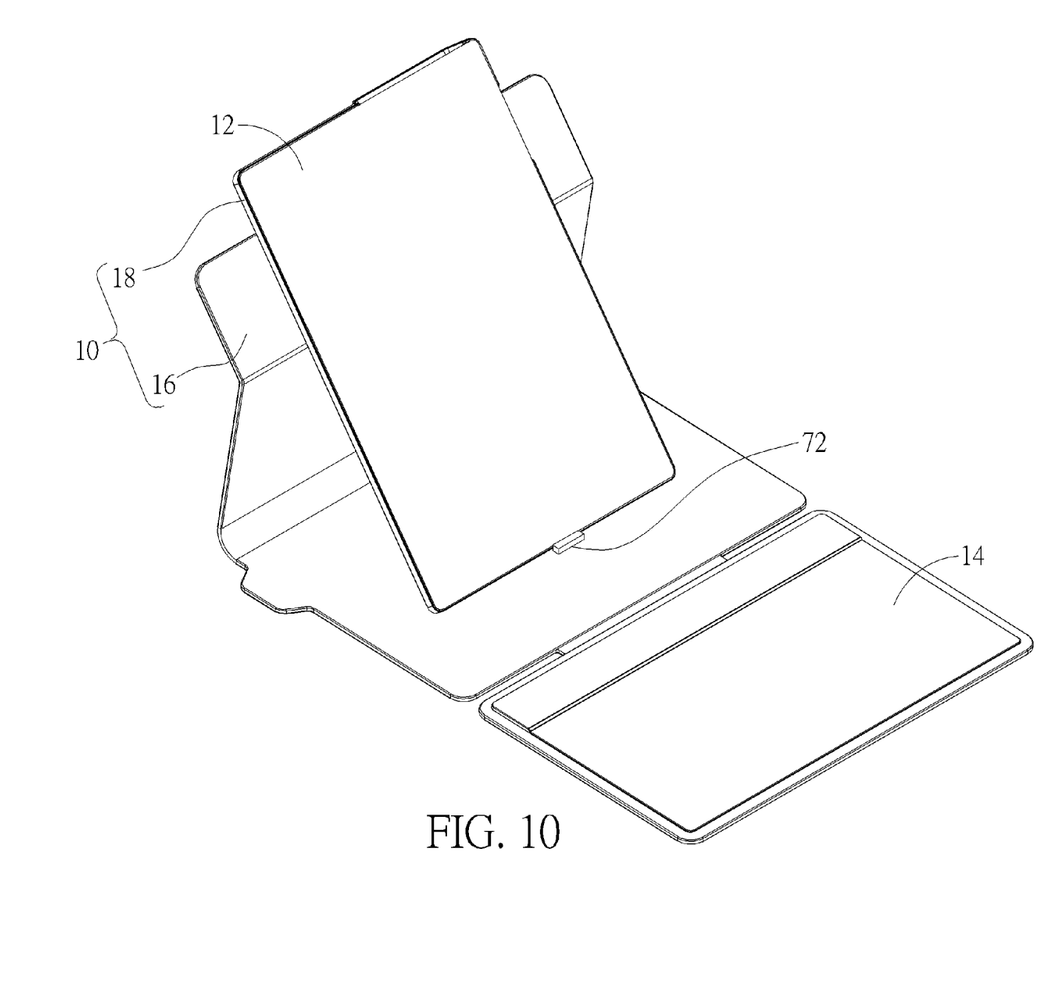
FIG. 10 is an assembly diagram of the protection device, the portable electronic device and the external input device according to the embodiment of the present invention.

Please refer to FIG. 9 and FIG. 10. FIG. 9 is a diagram of the protection device 10, the portable electronic device 12 and the external input device 14 not assembled with each other according to the embodiment of the present invention. FIG. 10 is an assembly diagram of the protection device 10, the portable electronic device 12 and the external input device 14 according to the embodiment of the present invention. The first connector 20 can be a pogo pin connector or a plug-in connector which is electrically connected to the connecting terminal of the portable electronic device 12 since the first surface 38 supports the portable electronic device 12. The cover 16 preferably includes the plurality of magnetic components 36 symmetrically disposed on sides and/or corners of the third body 32. The external input device 14 includes the magnets or the magnetic units that are disposed on position matched with the magnetic components 36. The second connector 22 can be the pogo pin connector or the plug-in connector. When the external input device 14 is assembled with the third body 32 of the cover 16 by the magnetic components 36, the connecting terminal of the external input device 14 can be electrically connected to the second connector 22, and a signal transmission channel between the portable electronic device 12 and the external input device 14 is established via the protection device 10.

When the protection device 10 is switched to an operation mode, a lateral edge of the holder 18 contacts against the second body 30 since the holder 18 is switched to the recumbent mode (as shown in FIG. 9) or the upright mode (as shown in FIG. 10). The second body 30 utilizes friction force or a restraining portion 72 to constrain a slide of the holder 18 relative to the second body 30, and the holder 18 can be stably located on a predetermined view angle. The restraining portion 72 can be a protrusion or a sunken slot formed on the second body 30. Structures of the restraining portion 72 are not limited to the above-mentioned embodiment and depend on design demand. The rotating range of the holder 18 may substantially equal to 90 degrees when the holder 18 is switched between the recumbent mode and the upright mode; however, the relative rotating range between the holder 18 and the cover 16 can be enlarged to 130 degrees for preferred adjustable tolerance, so the user can conveniently switch operational modes of the portable electronic device 12. The rotating range of the holder 18 corresponds to structural variation of the second contacting portion 70 (the arc sliding slot). As shown in FIG. 5 and FIG. 8, a sliding range of the first contacting portion 68 (the protrusion) within the second contacting portion 70 (the arc sliding slot) can be increased while a length of the second contacting portion 70 (the arc sliding slot) are extended without curvature variation, and the relative rotating range between the holder 18 and the cover 16 can be accordingly enlarged.

The protection device of the present invention respectively disposes the first connector and the second connector on different bodies of the cover, and utilizes the physical transmission cable to connect between the first connector and the second connector, so as to avoid a drawback that wireless signal transmission between the portable electronic device and the external input device is easily interfered in prior art. Furthermore, apart of the transmission cable (such as the third section) of the present invention is movably accommodated inside the hole structure and the arc structure, the third section of the transmission cable can be twisted and/or deformed under protection of the hole structure and the arc structure when the holder rotates relative to the cover, so the transmission cable is not damaged by the excess pulling motion. Comparing to the prior art, the protection device of the present invention utilizes the physical transmission cable to avoid transmission interruption that is always happened in wireless connection or pin-to-pin connection, and utilizes the hole structure and the arc structure to protect the physical transmission cable during rotation between the holder and the cover, so as to effectively increase serviceable life and safety of the product.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A protection device capable of rotatably supporting a portable electronic device, the protection device comprising:
   a cover comprising a rotary portion;
   a holder having a first surface and a second surface opposite to each other, the first surface having a sunken slot and being adapted to support the portable electronic device, the holder comprising:
     a hole structure connected to the sunken slot and formed between the first surface and the second surface, wherein the hole structure comprises an inlet and an outlet, the inlet is connected to the sunken slot, the outlet is an unclosed place of the arc structure, and a length of the third section of the transmission cable is greater than a distance between the inlet and the outlet; and
     an arc structure immovably protruding from the second surface and encircling the hole structure, the arc structure being slidably fitted within a circular hole on the rotary portion to rotate the holder relative to the cover;
   a first connector disposed on the first surface to electrically connect to the portable electronic device;
   a second connector disposed on the cover to electrically connect to an external input device; and
   a transmission cable having a first section, a second section and a third section connected with each other, the first section being connected to the first connector and disposed inside the sunken slot, the second section being connected to the second connector and embedded into the cover, the third section being connected between the first section and the second section and piercing through the hole structure in a flexibly deformable manner.

2. The protection device of claim 1, wherein the third section of the transmission cable is flexibly disposed inside the arc structure.

3. The protection device of claim 1, wherein the hole structure comprises a supporting portion, a first accommodating portion and an opening, the first accommodating portion is sunk into the supporting portion and faces the first surface, a part of the third section is movably disposed inside the first accommodating portion and passes from the first surface to the second surface through the opening.

4. The protection device of claim 3, wherein the hole structure further comprises a second accommodating portion sunk into the supporting portion and faces the second surface, the other part of the third section is movably disposed inside the second accommodating portion and connected to the second section through the unclosed place of the arc structure.

5. The protection device of claim 1, wherein the holder further comprises a constraining component assembled with the arc structure to buckle the rotary portion.

6. The protection device of claim 5, wherein the constraining portion is disposed on the holder via a fixing component.

7. The protection device of claim 1, further comprising:
a decorating component disposed on the first surface of the holder to shelter the sunken slot.

8. The protection device of claim 1, wherein the cover comprises a first body, a second body and a third body foldably connected with each other, the rotary portion is disposed on the first body to connect with the holder, the holder contacts against the second body since the holder is switched to an operation mode, the second connector is disposed on the third body to detachably assemble with the external input device.

9. The protection device of claim 8, wherein the cover further comprises at least one magnetic component disposed on the third body to assemble with the external input device by magnetic suction effect.

10. The protection device of claim 1, wherein the cover further comprises a first contacting portion disposed on the rotary portion, the holder further comprises a second contacting portion disposed on the arc structure, the first contacting portion contacts against the second contacting portion since the arc structure rotates relative to the rotary portion, so as to stop relative rotation between the cover and the holder.

11. The protection device of claim 1, wherein a range of the relative rotation between the cover and the holder is smaller than 130 degrees.

12. A protection device capable of rotatably supporting a portable electronic device, the protection device comprising:
a cover comprising a rotary portion;
a holder having a first surface and a second surface opposite to each other, the first surface having a sunken slot and being adapted to support the portable electronic device, the holder comprising:
a hole structure connected to the sunken slot and formed between the first surface and the second surface; and
an arc structure disposed on the second surface to rotatably assemble with the rotary portion;
a first connector disposed on the first surface to electrically connect to the portable electronic device;
a second connector disposed on the cover to electrically connect to an external input device; and
a transmission cable having a first section, a second section and a third section connected with each other, the first section being connected to the first connector and disposed inside the sunken slot, the second section being connected to the second connector and embedded into the cover, the third section being connected between the first section and the second section and piercing through the hole structure in a flexibly deformable manner;
wherein the hole structure comprises an inlet and an outlet, the inlet is connected to the sunken slot, the outlet is an unclosed place of the arc structure, and a length of the third section of the transmission cable is greater than a distance between the inlet and the outlet.

* * * * *